(12) United States Patent
Welch et al.

(10) Patent No.: US 9,755,472 B2
(45) Date of Patent: Sep. 5, 2017

(54) HIGH SPEED ROTOR CONNECTION SUPPORT

(71) Applicant: HAMILTON SUNDSTRAND CORPORATION, Charlotte, NC (US)

(72) Inventors: Timothy R. Welch, Roscoe, IL (US); Brian C. Konopa, Rockford, IL (US); Glenn C. Lemmers, Jr., Loves Park, IL (US); Luke Wagner, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 858 days.

(21) Appl. No.: 14/162,287

(22) Filed: Jan. 23, 2014

(65) Prior Publication Data

US 2015/0097464 A1    Apr. 9, 2015

Related U.S. Application Data

(60) Provisional application No. 61/888,341, filed on Oct. 8, 2013.

(51) Int. Cl.
*H02K 3/51* (2006.01)
*H02K 3/50* (2006.01)
(Continued)

(52) U.S. Cl.
CPC .............. *H02K 3/51* (2013.01); *H02K 3/50* (2013.01); *H02K 3/52* (2013.01); *H02K 3/527* (2013.01);
(Continued)

(58) Field of Classification Search
CPC .. H02K 3/46; H02K 3/50; H02K 3/51; H02K 3/52; H02K 3/527; H02K 3/528; H02K 11/0021; H02K 11/028; H02K 11/042; H02K 11/20; H02K 13/06; H02K 15/028; H02K 2203/03
USPC ............ 118/18 A; 310/64, 67 R, 68 B, 68 D, 310/68 R, 71, 72, 89, 400, 402, 403, 404, 310/405, 406, 407, 408, 409, 410, 411, 310/413
See application file for complete search history.

(56) References Cited

U.S. PATENT DOCUMENTS 3,542,166 A     11/1970 Harrison
4,643,513 A *   2/1987 Martin ............... H01R 4/34
                                                439/788
(Continued)

FOREIGN PATENT DOCUMENTS

DE      202010017081     3/2011

OTHER PUBLICATIONS

Extended European Search Report dated May 3, 2016 in European Application No. 14187870.2.

*Primary Examiner* — Joshua Benitez-Rosario
*Assistant Examiner* — Rashad Johnson
(74) *Attorney, Agent, or Firm* — Snell & Wilmer L.L.P.

(57) ABSTRACT

A rotor connection support comprising a main connection ring configured to reduce the moment load on fastener locations (such as threaded fastener locations) by integrating stand-off posts into a high strength plate are discussed herein. These stand-offs may be configured to reduce the stresses on the high stress concentration/low cross section threads. Also, included is an improved wire routing and wire support configured to maximize the fatigue cycles of the main field lead wires.

10 Claims, 13 Drawing Sheets

(51) Int. Cl.
  *H02K 3/52* (2006.01)
  *H02K 13/06* (2006.01)
  *H02K 11/20* (2016.01)

(52) U.S. Cl.
  CPC .............. *H02K 3/528* (2013.01); *H02K 11/20* (2016.01); *H02K 13/06* (2013.01)

(56) References Cited

U.S. PATENT DOCUMENTS

| | | | | |
|---|---|---|---|---|
| 7,750,516 B2* | 7/2010 | Elser | ........................ | H02K 3/50 310/68 D |
| 7,816,827 B2* | 10/2010 | Ishizeki | ................. | H02K 3/522 310/71 |
| 7,868,494 B2* | 1/2011 | Grosskopf | ........... | H02K 11/042 310/68 D |
| 8,022,592 B2* | 9/2011 | Kaneiwa | .................. | H02K 3/50 310/214 |
| 8,056,684 B2* | 11/2011 | Smith | .................... | F16D 55/226 188/106 P |
| 2006/0097590 A1 | 5/2006 | Schill | | |
| 2007/0108854 A1* | 5/2007 | Osborn | ................. | H02K 11/042 310/68 D |
| 2008/0218035 A1* | 9/2008 | Naghshineh | ......... | H02K 11/042 310/68 D |
| 2009/0218183 A1 | 9/2009 | Burgoon et al. | | |
| 2010/0158724 A1* | 6/2010 | Ihle | ........................ | F04D 13/06 417/423.7 |
| 2011/0266899 A1* | 11/2011 | Patel | .................... | H02K 11/042 310/71 |
| 2012/0025640 A1* | 2/2012 | Tang | .................... | H02K 5/1735 310/59 |
| 2012/0190250 A1* | 7/2012 | Patel | .................... | H02K 5/225 439/709 |
| 2012/0247883 A1 | 10/2012 | Root | | |
| 2013/0270971 A1* | 10/2013 | Dorner | ..................... | H02K 3/50 310/68 B |
| 2014/0354086 A1* | 12/2014 | Vedy | ........................ | H02K 3/50 310/43 |

* cited by examiner

US 9,755,472 B2

HIGH SPEED ROTOR CONNECTION SUPPORT

CROSS-REFERENCE TO RELATED APPLICATIONS

This application is a nonprovisional of, and claims priority to, and the benefit of U.S. Provisional Application No. 61/888,341, entitled "HIGH SPEED ROTOR CONNECTION SUPPORT," filed on Oct. 8, 2013, which is hereby incorporated by reference in its entirety.

FIELD

The present disclosure relates to wired couplings, and more particularly, to systems and methods of addressing centrifugal loads in couplings.

BACKGROUND

A rotor may be a non-stationary part of a rotary electric motor or electric generator. The wires and magnetic field of the motor may be arranged so that a torque is developed about the rotor's axis. In some designs, the rotor can act to serve as the motor's armature, across which an input voltage is supplied. In the armature, an electromotive force may be created by the relative motion of the armature and the field. Conventional generator elements that protrude in the axial direction away from the face of a spinning shaft may experience high radial loads during operation.

SUMMARY

The present disclosure relates to a rotor connection ring. The rotor connection ring may include a stand-off configured to couple to a male threaded coupler. The threaded stand-off may comprise female threading. At least a portion of the female threading may be located above a plane defined by a top outwardly facing surface of the connection ring. The rotor connection ring may further include a stand-off configured to couple to a wire support fastener, wherein the wire support fastener is configured to retain a wire cover. The rotor connection ring may further comprise an integral counter balance weight. The rotor connection ring may be coupled to and/or an element of a DC rotor.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 1:
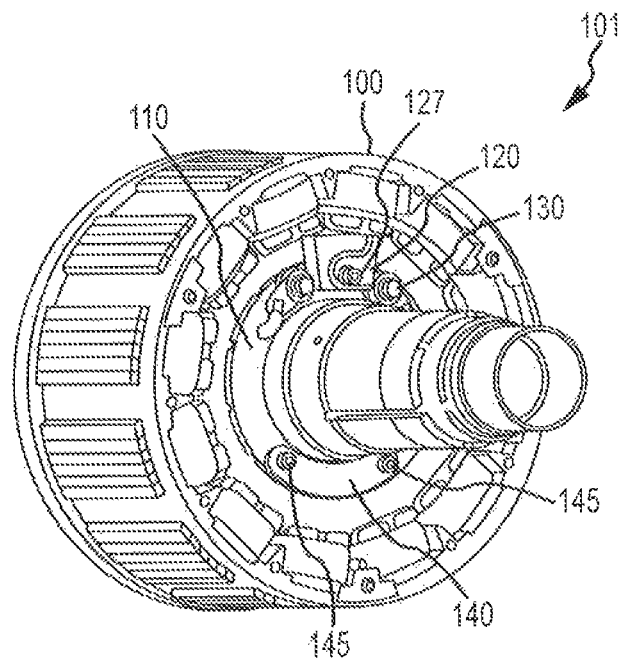
FIG. 1 depicts an isometric view of a prior art DC rotor.
Figure 2:
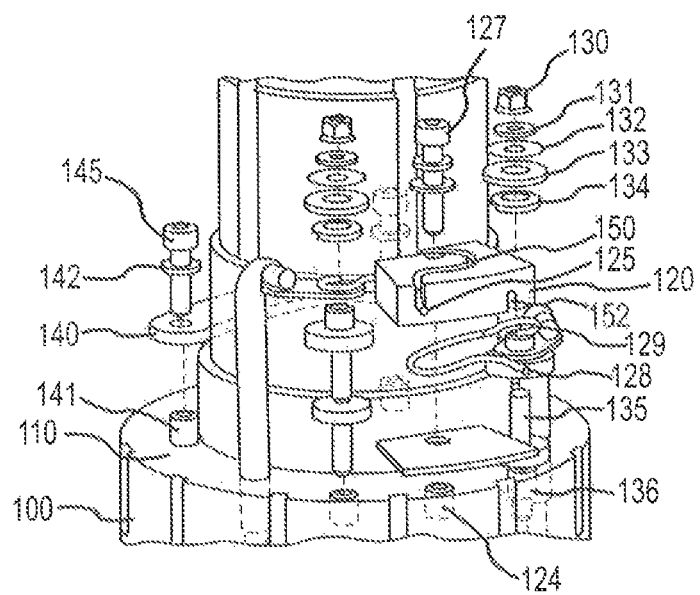
FIG. 2 depicts an exploded view of the many of the element s of the prior art DC rotor of FIG. 1.

With reference to prior art FIGS. 1 and 2 and system 101, previous designs of high speed DC connections between the main field windings and the rectifier included of a stack of components bolted together using a flanged stud support/DC connection 130. Due to high centrifugal loads, the threaded studs 130 tended to fail and/or yield during test and/or operation. Another yield concern may be associated with the main field lead wires 125, 128 being unsupported and result in wire fatigue breaks.

Figure 3:
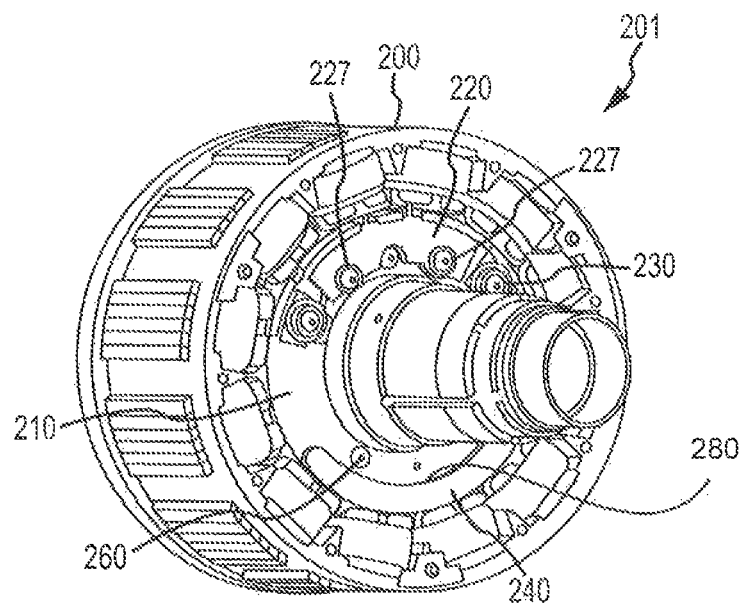
FIG. 3 depicts an isometric view of a DC rotor according to various embodiments.
Figure 4:
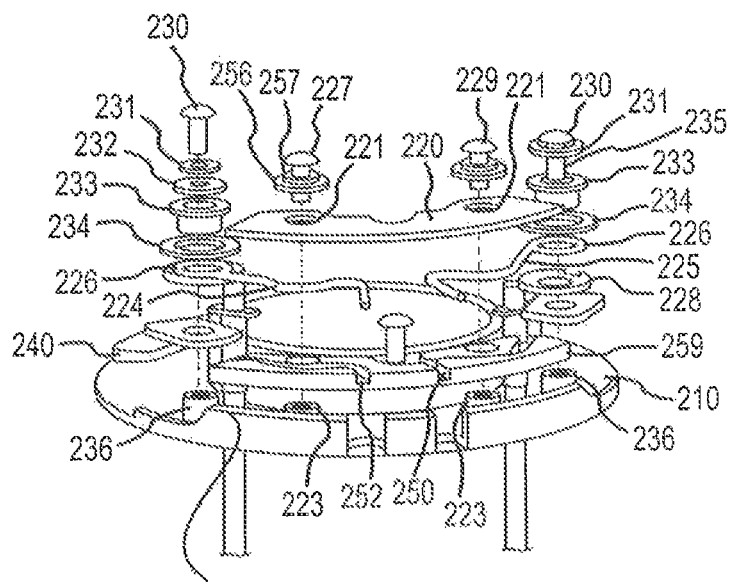
FIG. 4 depicts an exploded view of the many of the elements of the DC rotor of FIG. 3 according to various embodiments.
Figure 8:
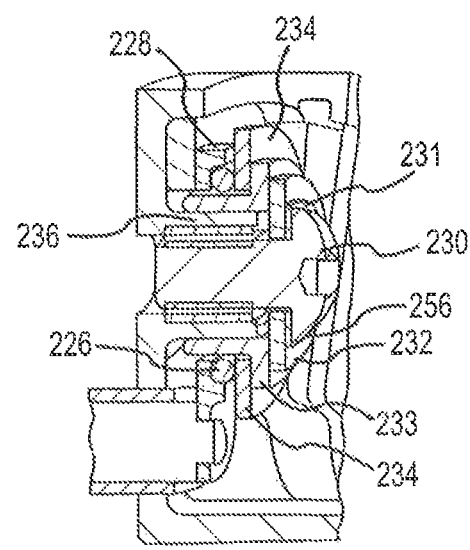
FIG. 8 depicts a cross sectional view of the DC coupling of FIG. 6 according to various embodiments.
Figure 17:
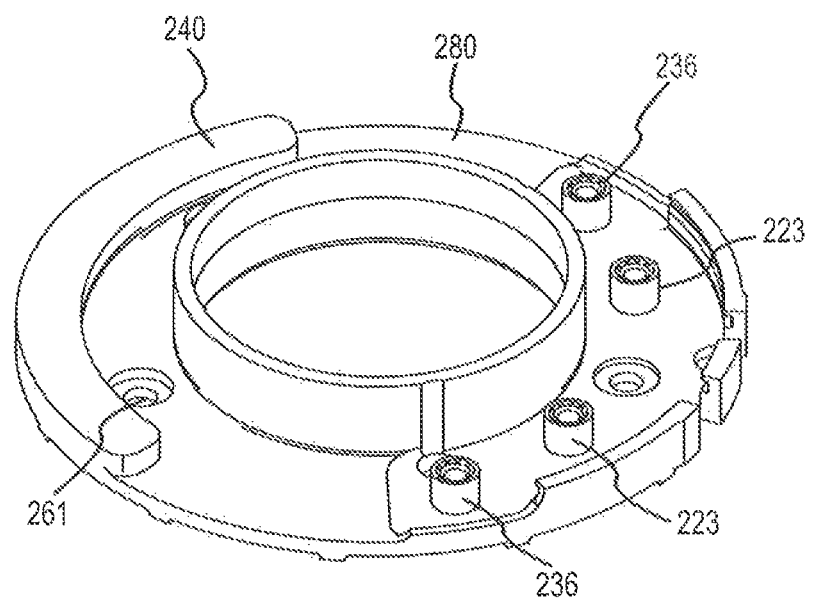
FIG. 17 depicts a DC ring according to various embodiments.

According to various embodiments and with brief reference to FIGS. 3 and 4, system 201 depicts a redesigned connection scheme for a DC rotor 200. System 201 comprises a rotor connection support (DC coupling 230) redesign comprising a main connection ring, such as DC ring 280 (See FIG. 17), that reduces the moment load on fastener locations, such as threaded fastener locations, by integrating stand-off posts 223, 236 into a high strength plate 280. These stand-offs may be configured to reduce the stresses on the high stress concentration/low cross section threads. System 201 also comprises one or more insulator 233 (with brief reference to FIG. 8) to maintain dielectric capability. Also included in system 201 is an improved wire routing 250, 252 and wire support 259 to maximize the fatigue cycles of the main field lead wires 224, 225. System 201 further comprises a connection ring configured to move the integral posts (DC bus bar comprising an integral cup washer 228) outward radially such that the DC bus bar could be redesigned to minimize shear stresses between the bar and flag (with brief reference to FIG. 18 with integral wire support wall).

With renewed reference to FIG. 1, system 101 comprises a wire support 120, a wire support fastener 127, and a DC connection 130. System 101 further comprises a balance weight 140 configured to counter balance the weight of the components on the other side of the face 110 of the rotor 100. The counter weight may be coupled to the rotor 100 by fasteners 145.

Figure 5:
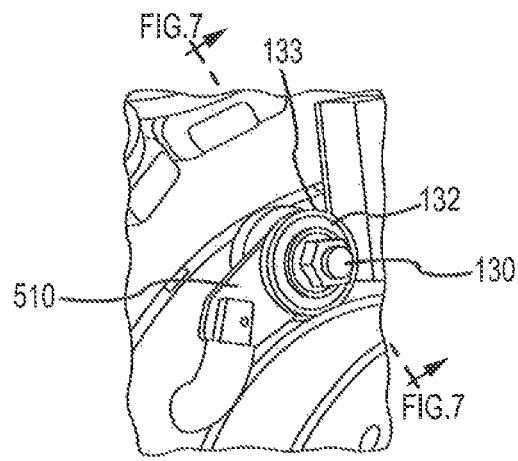
FIG. 5 depicts a close up view of the DC coupling of prior art FIG. 1.
Figure 7:
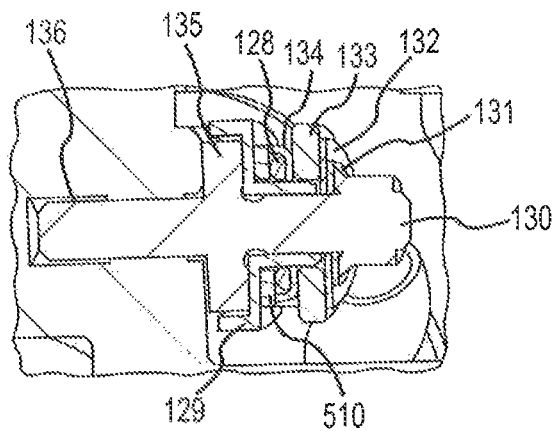
FIG. 7 depicts a cross sectional view of a DC coupling of prior art FIG. 5.

With renewed reference to FIG. 2 and with brief reference to prior art FIGS. 5 and 7, system 101 comprises DC connection 130. Notably, the DC connection 130 of system 101 comprises a steel washer 132, wire cup washer 134, first insulator 133, Bellville washer 131, DC post 135, DC bus bar 510, and a second insulator 129, and a threaded DC post fastener housing 136. Wire 128 may be held in place between wire cup washer 134 and DC bus bar 510. Wire 128 may wrap around DC post 135 at location 121. A partial loop of wire 128 may be wrapped at least partially around DC post 135. Wire 128 may be positioned within a wire support 120.

Figure 9:
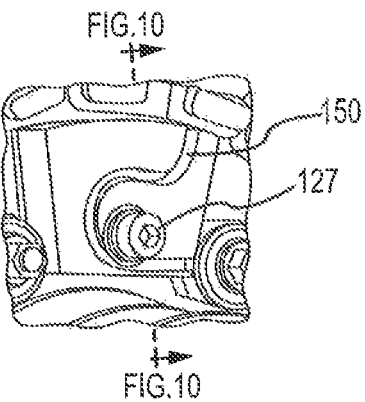
FIG. 9 depicts a close up view of a wire support of prior art FIG. 1.
Figure 10:
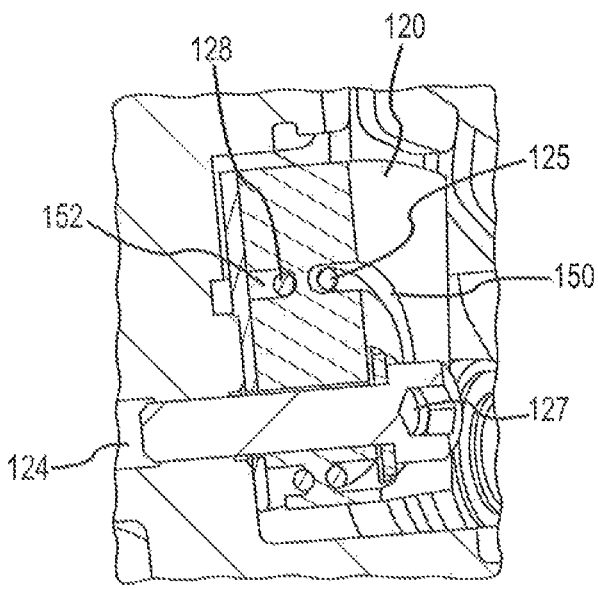
FIG. 10 depicts a cross sectional view of the wire support of prior art FIG. 9.

With reference to FIG. 2 and with brief reference to prior art FIGS. 9 and 10, system 101 comprises wire support 120. Wire support 120 may comprise channels 150 and 152 configured to retain and orient wires 125, 128. System 101 comprises a wire support fastener 127. The wire support fastener 127 may be housed by and coupled to threaded wire support fastener housing 124.

Figure 13:
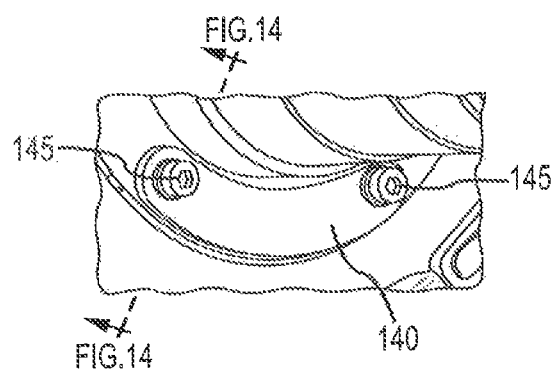
FIG. 13 depicts a close up view of a counter balance of prior art FIG. 1.
Figure 14:
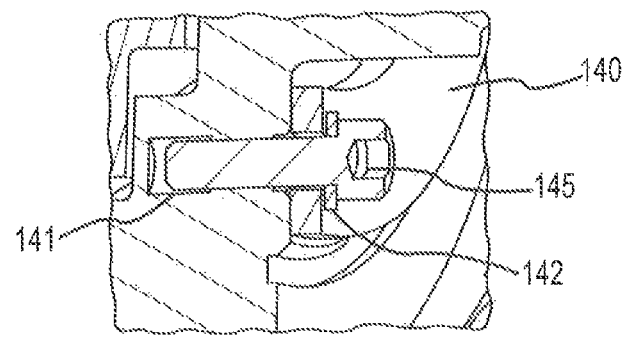
FIG. 14 depicts a cross sectional view of the counter balance of prior art FIG. 13.
Figure 15:
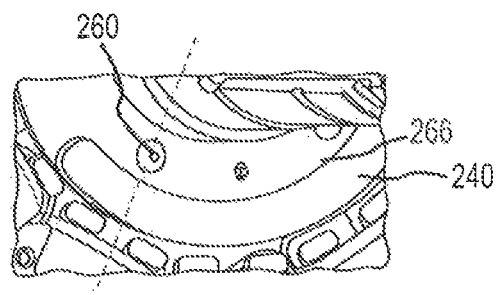
FIG. 15 depicts a close up view of a counter balance of FIG. 3 according to various embodiments.
Figure 16:
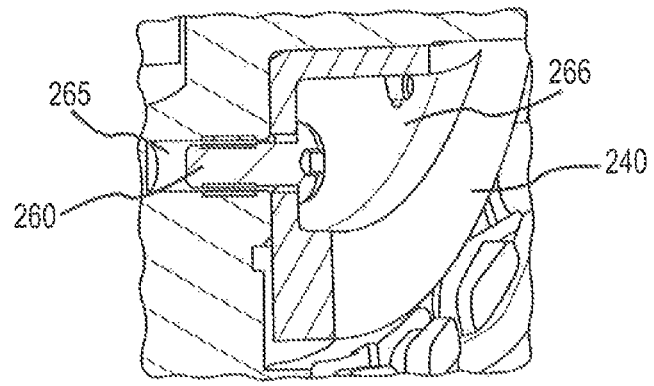
FIG. 16 depicts a cross sectional view of the counter balance of prior art FIG. 15 according to various embodiments.

With reference to FIG. 2 and with brief reference to prior art FIGS. 13 and 14, system 101 comprises balance weight 140. Balance weight 140 may be retained by balance weight fastener 145. A steel washer 142 may be positioned between a head of balance weight fastener 145 and balance weight 140. Balance weight fastener 145 may be housed in a threaded balance weight fastener housing 141.

Reduction of loads on the bolts/fasteners of the prior art system (e.g. system 101) is desirable. Historically, these bolts/fasteners, such as threaded stud 130, fasteners 145 and/or wire support fastener 127 were screwed into their respective housings, such as threaded DC post fastener housing 136, balance weight fastener housing 141 and/or threaded wire support fastener housing 124. Each had a relatively long shaft extending away from the face 110 of rotor 100. As the rotor 100 is brought to operational speed, the radial loads on these fasteners extending out from the face 110 of the rotor 100 may cause the fasteners to yield, such as during strength tests. Additionally, wire supports extending from the face 110 of the rotor 100 experience high radial loads. These high radial loads, may cause concerns and/or failure of the wire 128 to bus bar 510 coupling. Similarly, the axial loads on the balance weight 140 may be undesirably high.

In contrast to system 101, the fasteners 227, 230 of system 201 comprise minimized lengths of unsupported threaded fasteners lengths. The DC ring 280 of system 201 carries much of the radial load that would otherwise be experienced by the fastener 227, 230 shafts. DC ring 280 may be made from any material, however, in various embodiments, DC ring 280 is comprised of metal. DC ring 280 may comprise a substantially annular shape. DC ring 280 comprises one or more raised threaded stand-offs, such as stand-off 223, 236. Stand-off 223, 236 protrudes from a surface of DC ring 280. Threads of stand-off 223, 236 may similarly be located above a plane defined by the location where stand-off 223, 236 interfaces with and axially extends from a face of DC ring 280. Stand-off 223, 236 may be integrally in/on formed in DC ring 280. Stand-off 223, 236 may be configured to receive a shortened fastener 227, 230 (e.g. a fastener with a shaft that is shorter than the conventional fasteners). Stated another way, the threads of the fastener 227, 230 are located axially closer to the head of the bolt. Thus, the force of the radial load is largely experienced by the stand-off 223, 236 rather than the fastener 227, 230.

Figure 6:
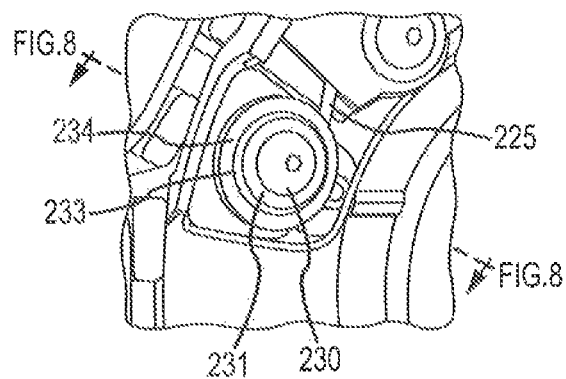
FIG. 6 depicts a close up view of the DC coupling FIG. 3 according to various embodiments.
Figure 18:
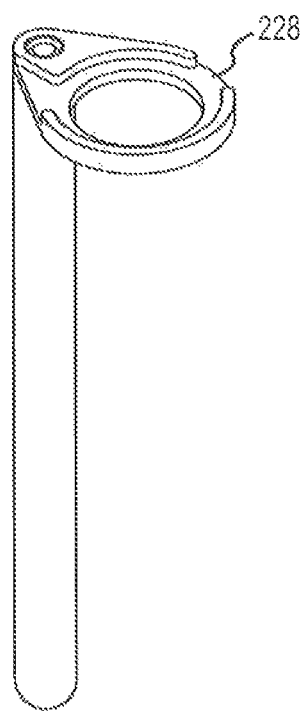
FIG. 18 depicts a DC bus bar comprising an integral cup washer according to various embodiments.
Figure 20:
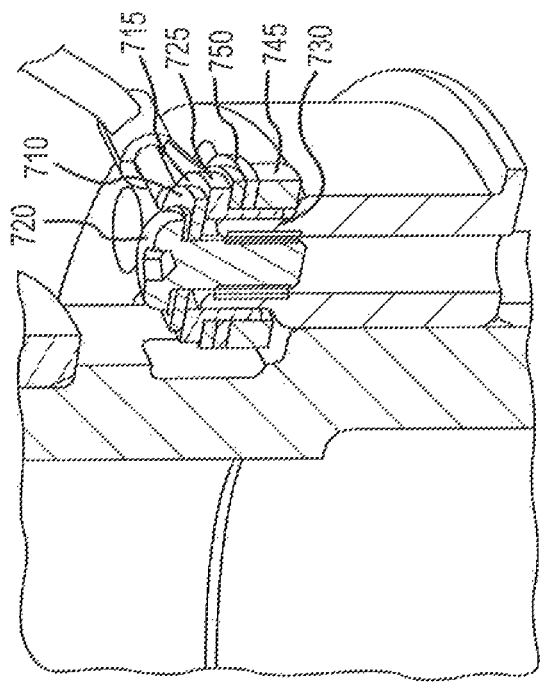
FIG. 20 depicts a cross sectional view of the fastening structure of FIG. 19 according to various embodiments.

System 201 comprises raised stand-offs having high strength configured to reduce the overhung moment load on any threaded fasteners, such as fasteners 227, 230. For instance, with reference to FIGS. 6 and 8, a DC coupling 230 of system 201 is depicted. A fastener 230, coupled to a disc spring/Bellville washer 256, coupled to a washer 232, such as a steel washer is depicted. In general, a disc spring comprises a generally convex disc supported at the outer periphery by one force and an opposing force on the center of the disc. A disc spring may generate high force in a very short spring length and with minimal movement in response to being compressed. The steel washer 232 may apply force on an insulator 233, such as a torlon insulator. The thickness of the insulator 233 surrounding the fastener 230 may be increased as compared with conventional insulators, such as the insulators of system 101. A flange of the insulator 233 may apply force on a steel washer 234 located proximate a wire 225. The wire 225 may be positioned within a DC bus bar comprising an integral cup washer 228 (an additional depiction of cup washer 228 is shown in FIG. 18). A second insulator, such as a TORLON (polyamide-imide) insulator, may be coupled to the DC bus bar. Steel washer 232 may substantially adjacent to raised stand-off 236. As compared with system 101, system 201 may eliminate and/or reduce the fastener 230 moment loads, such as a moment load experienced at operational speed. Also, the wire cup washer 134 of system 101 is eliminated in system 201.

Figure 11:
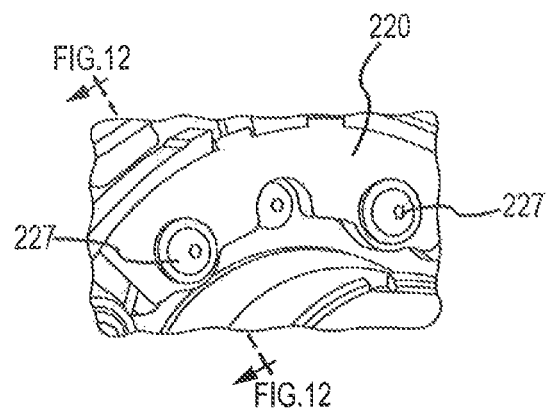
FIG. 11 depicts a close up view of a wire support of FIG. 3 according to various embodiments.
Figure 12:
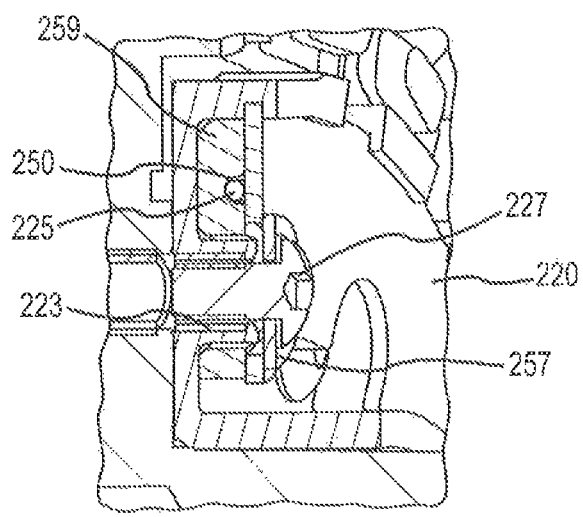
FIG. 12 depicts a cross sectional view of the wire support of FIG. 11 according to various embodiments.

According to various embodiments and with reference to FIGS. 11 and 12 a wire support 259, wire cover 220 and wire support fastener 227 of system 201 are depicted. Wire support fastener 227 may be inserted into and coupled to raised stand-off 223. Wire support fastener 227 may be threaded to interact with respective threading of raised stand-off 223. The head of wire support fastener 227 may apply force on a Bellville washer 256 which is coupled to a steel washer 257. The diameter of steel washer 257 is suitably large to overlap and apply force on wire cover 220. Wire cover 220 may be made from any suitable material; however, is preferably plastic. Wire cover 220 covers at least a portion of wire support 259 directly. For instance, wire cover 220 covers wire support 259 and protects oil from interacting with wire 224, 225. Wire support 259 comprises at least one channel 250, 252 to orient and retain a wire 224, 225. Wire support 259 is lower profile than prior art wire support 120 of system 101 (see FIGS. 1 and 10). For instance, wire support 120 comprises two levels of wires 125, 128 having channels 150, 152. Though they do not touch, these channels 150, 152 are located in a stacked orientation within wire support 120. Wire support 259 of system 201 carries a single level of wire 224, 225 (channels 250 and 252 are generally within the same radial plane). Wires 224, 225 may be positioned within channel 250 and channel 252 without obstruction. This results in an ease of assembly. For instance, as depicted in FIG. 2, in system 101, at least one wire, such as wire 128 may need to be excessively bent to access channel 152. Also, the routing of the wire 224, 225 within the channel 250, 252, includes fewer bends of the wire 224, 225 as compared with prior art wire channels 150, 152. According to various embodiments and with reference to FIG. 4, wires 224, 225 may comprise an annular loop 226 configured to mate with integral cup washer 228. Thus, the security of the coupling is increased and less liable to become uncoupled.

According to various embodiments, and with reference to FIGS. 3, 4, 15 and 16, system 201 may comprise an integral counter balance weight 240. In this way, counter balance weight 240 may be integrally formed as a portion of DC ring 280. Thus the counterbalance need not be coupled to DC ring 280 through secondary fasteners. Fastener 260 may pass through a through hole in DC ring 280 and be received in housing 265 to couple DC ring 280 to rotor 200. Fastener 260 head may reside in a recess 266 of counter balance weight 240. Counter balance weight 240 of system 201, being integral to DC ring 280, eliminates fasteners, such as fastener 145 in system 101 as a point of failure or yield point. The mass of counter balance weight 240 is located away from the axis of rotation of rotor 200 (e.g. towards the distal edge of DC ring 280). Counter balance weight 240 is suitably sized to counter balance the elements opposite it on the rotor face 210. For instance, counter balance weight 240 is suitably sized and positioned to counter balance the mass of the wire support 259, wire cover 220 and DC coupling 230 elements. The wire support 259, DC coupling 230 and counter balance 240 may all be coupled to DC ring 280. DC ring 280 may form a continuous annular loop.

System 201 provides minimized threaded connection bending stresses, eliminated radially unsupported plastic components, a reduced part count, improved design for manufacturing, and increased design robustness as compared to conventional structures, such as system 101. Integral standoffs, similar to stand-offs 223, 236, configured to support high speed rotor connections (and associated fasteners) may be implemented in any system subject to axial loads.

Figure 19:
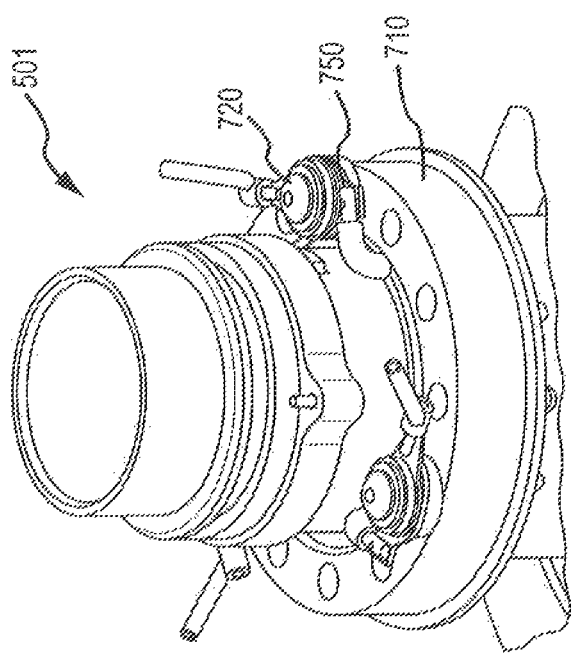
FIG. 19 depicts an exciter connection system according to various embodiments.
Figure 22:
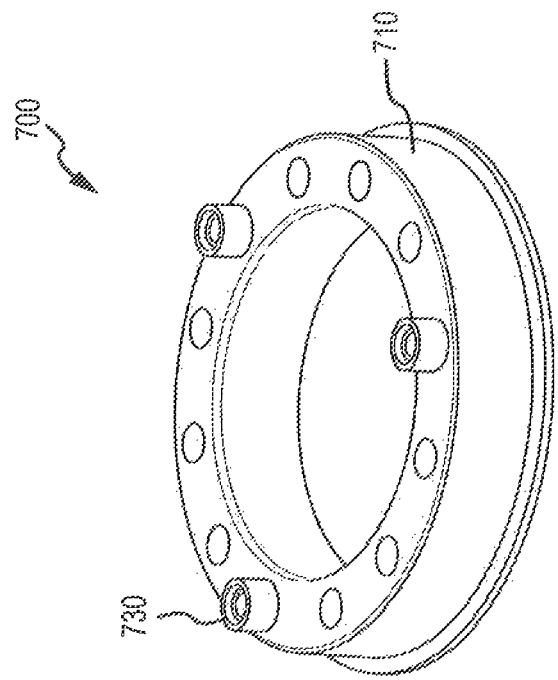
FIG. 22 depicts an exciter hub comprising stand-offs according to various embodiments.
Figure 24:
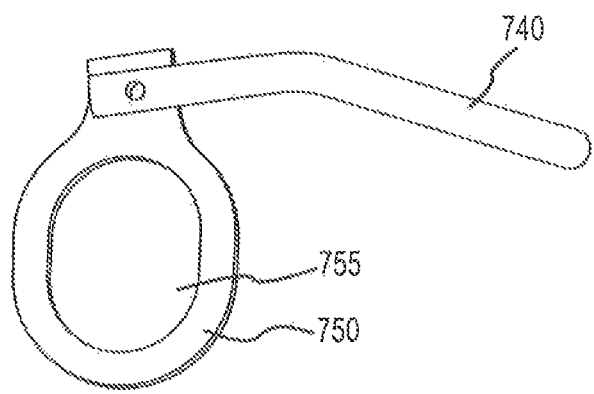
FIG. 24 depicts an exciter hub stand-off bus bar flag according to various embodiments.

For instance, and with reference to FIG. 19, an exciter system 501 having integral AC coupling stand-offs 730 is depicted. Stand-offs 730 may be integral to exciter hub 710. According to various embodiments, system 501 comprises a raised stand-off 730 configured to carry an increased percentage of the radial load, and reduce load carried by the bolt/fastener/AC coupling 720. Similar to system 201, system 501 comprises an integrated a stand-off 730 configured to locate the first thread of fastener 720 as close as possible to the head of the fastener 720. In this way, stand-off 730 carries the axial load instead of fastener 720 carrying the axial load. A modified bus bar flag 750 is implemented to interact with the AC coupling (see FIG. 24).

FIG. 19, depicts a cross sectional view of the AC coupling of exciter system 501. Fastener 720 may be a button head screw. Fastener 720 may be coupled to a Belleville washer 710, NAS washer 715, and insulator 725. A bus bar having a flag 750 with increased diameter may be coupled to system 501. Insulator 745 may be coupled between bus bar flag 750 and exciter hub 710.

Figure 21:
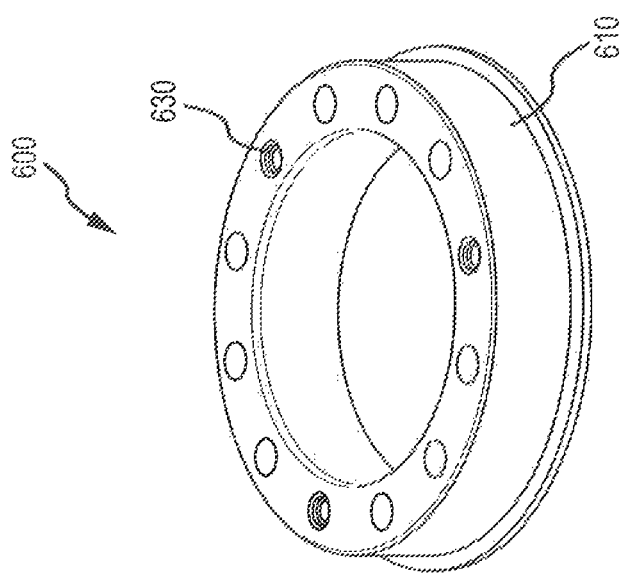
FIG. 21 depicts a prior art exciter hub ring.
Figure 23:
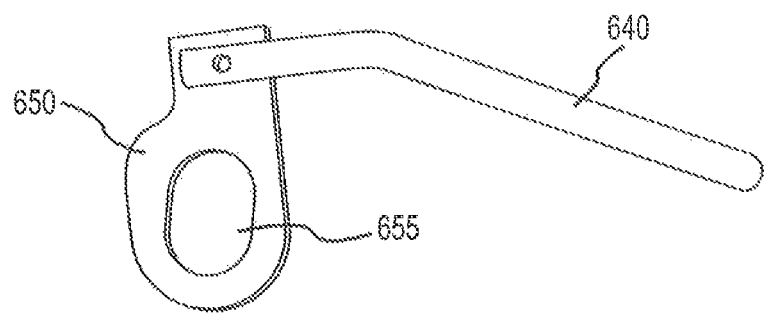
FIG. 23 depicts a prior art bus bar flag.

FIG. 21 depicts a prior art exciter hub 610 used in prior art system 600. The fastener coupling points 630 a recessed into the face of exciter hub 610. In contrast, FIG. 23 depicts an exemplary exciter hub 710 of system 700. Exciter hub 710 comprises raised stand-offs 730. According to various embodiments, conventional systems, such as system 600, may be retrofit with an adaptor configured to be inserted into fastener coupling points 630 and designed to receive a fastener, such as fastener 720 (not shown).

With reference to FIG. 23, the bus bar 640 flag 650 of system 600 may comprise a relatively narrow opening 655 to receive an AC coupling. In contrast, and with reference to FIG. 24, the bus bar 740 flag 750 of system 501 may comprise an opening 755 configured to surround stand-off 730 and be coupled to the elements of AC coupling 720.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rotor connection ring comprising:
   a threaded stand-off configured to couple to a male threaded coupler,
   wherein the threaded stand-off comprises female threading,
   wherein at least a portion of the female threading is located above a plane defined by a top outwardly facing surface of the rotor connection ring,
   wherein the male threaded coupler comprises a wire support fastener configured to retain a wire cover,
   the wire cover is positioned at least partially overlapping a wire support,
   the wire support comprises a pair of channels configured to house two different wires, and
   the pair of channels are substantially aligned in the same axial plane.

2. The rotor connection ring of claim 1, wherein the rotor connection ring further comprising an integral counter balance weight.

3. The rotor connection ring of claim 2, wherein the counter balance weight is sized and positioned to offset at least a weight of a wire cover, a wire support, and the DC threaded coupler.

4. The rotor connection ring of claim 1, wherein the threaded stand-off is integral to the rotor connection ring.

5. The rotor connection ring of claim 1, wherein the threaded stand-off is configured to carry an axial load.

6. The rotor connection ring of claim 1, further comprising a DC bus bar comprising an integral cup washer configured to retain an annularly shaped wire, wherein the integral cup washer couples to a wire configured to be secured via the male threaded coupler.

7. A DC rotor system comprising:
   a connection ring comprising:
      a wire support fastener stand-off configured to couple to a wire support fastener, wherein the wire support fastener is configured to retain a wire cover, wherein wire support fastener stand-off comprises female threading, wherein at least a portion of the female threading is located above a plane defined by a top outwardly facing surface of the connection ring, and
      a wire support retained by the wire cover, wherein the wire support comprises a pair of channels configured to house two different wires wherein the pair of channels are substantially traverse the same axial plane.

8. A DC rotor system comprising:
   a connection ring comprising:
   a wire support fastener stand-off configured to couple to a wire support fastener, wherein the wire support fastener is configured to retain a wire cover, wherein wire support fastener stand-off comprises female threading, wherein at least a portion of the female threading is located above a plane defined by a top outwardly facing surface of the connection ring, and
   at least one of:
      a counter balance weight formed integral to the connection ring; and
      a DC coupler stand-off configured to couple to a male threaded coupler, wherein DC coupler stand-off comprises female threading, wherein at least a portion of the female threading is located above the plane defined by the top outwardly facing surface of the connection ring.

9. A DC rotor system comprising:
   a connection ring comprising:
   a wire support fastener stand-off configured to couple to a wire support fastener, wherein the wire support fastener is configured to retain a wire cover, wherein wire support fastener stand-off comprises female threading, wherein at least a portion of the female threading is located above a plane defined by a top outwardly facing surface of the connection ring, and
   a DC coupler stand-off, wherein the DC coupler stand-off and the wire support fastener standoff are configured to carry at least one of axial loads and radial loads.

10. The DC rotor system of claim 9, further comprising a DC bus bar comprising an integral cup washer configured to retain an annularly shaped wire secured by the male threaded coupler.

* * * * *